(12) United States Patent
May et al.

(10) Patent No.: US 6,953,034 B2
(45) Date of Patent: Oct. 11, 2005

(54) RECONFIGURABLE SPEAR GUN

(75) Inventors: William May, 10314 Deepbrook Dr., Riverview, FL (US) 33569; Carl Sciabarra, Valrico, FL (US)

(73) Assignee: William May, Riverview, FL (US)

( * ) Notice: Subject to any disclaimer, the term of this patent is extended or adjusted under 35 U.S.C. 154(b) by 0 days.

(21) Appl. No.: 10/946,082

(22) Filed: Sep. 21, 2004

(65) Prior Publication Data

US 2005/0039734 A1 Feb. 24, 2005

Related U.S. Application Data

(62) Division of application No. 10/271,010, filed on Oct. 15, 2002, now Pat. No. 6,811,503.

(51) Int. Cl.[7] .................................................. F41B 7/04
(52) U.S. Cl. ........................... 124/17; 124/20.3; 124/22
(58) Field of Search ........................... 43/6; 124/16, 17, 124/20.3, 22, 56, 71, 73

(56) References Cited

U.S. PATENT DOCUMENTS

| | | | | |
|---|---|---|---|---|
| 213,976 A | * | 4/1879 | Coloney .................. | 124/22 |
| 2,888,004 A | * | 5/1959 | Steiner .................... | 124/27 |
| 3,741,190 A | * | 6/1973 | Lopez ..................... | 124/22 |
| 5,343,850 A | * | 9/1994 | Steer ...................... | 124/64 |
| 5,832,911 A | * | 11/1998 | Mayville et al. .......... | 124/73 |
| 6,708,683 B1 | * | 3/2004 | Harris ..................... | 124/20.3 |

* cited by examiner

*Primary Examiner*—John A. Ricci
(74) *Attorney, Agent, or Firm*—Pendorf & Cutliff; Evelyn A. Defillo (57) ABSTRACT

The present invention concerns a double spear gun comprising: a first spear gun having a top side and a bottom side; a second spear gun having a top side and a bottom side; an upper mounting block having a top side and a bottom side, the upper mounting block top side adapted for releasably engaging the bottom side of the first spear gun, the upper mounting block further including a fastener; a lower mounting block having a top side and a bottom side, the lower mounting block bottom side adapted for releasably engaging the top side of the second spear gun, the lower mounting block further including a fastener; wherein the fastener of the upper mounting block is releasably engaged with the fastener of the lower mounting block. Further the present invention contemplates a housing to accommodate a laser pointer or a flashlight, a housing to receive a power head, a support for holding a spear gun butt, and a spear stopper.

10 Claims, 9 Drawing Sheets

RECONFIGURABLE SPEAR GUN

CROSS REFERENCE TO RELATED APPLICATION

This application is a Divisional application of U.S. application Ser. No. 10/271,010 filed on Oct. 15, 2002, now U.S. Pat. No. 6,811,503 entitled "RECONFIGURABLE SPEAR GUN" allowed Jun. 16, 2004.

TECHNICAL FIELD

The present invention concerns a spear gun, and more specifically, a double spear gun that can be easily reconfigured and adapted to a variety of hunting conditions, as well as accessories that facilitate the use of the spear gun.

BACKGROUND OF THE INVENTION

In recent years, the sport of spear fishing with spear guns has grown rapidly due to the greater availability of, and improvements in, underwater diving devices.

Conventional spear guns may be classified according to two general types. On the one hand, pneumatic spear guns utilize an air-driven piston to drive the spear shaft down a barrel. Since pneumatic cylinders tend to be short, pneumatic spear guns are characterized by being relatively compact. On the other hand, elastic band powered, or sling-type, spear guns use one or more rubber bands to propel the spear shaft. Great power can be developed by using long barrels and strong rubber bands. Thus, elastic band powered spear guns tend to be relatively long barreled. Short guns tend to be easier to aim in the dense underwater environment; however, the power and accuracy of a spear gun tends to increase proportionately with increasing barrel length.

A diver often encounters different firing needs in different situations.

For example, in locations such as in shipwrecks, in shallow water, and under bridges, it is possible for the diver to approach within a few feet of a school of fish without disturbing and scattering them. Under these conditions, optimum performance requires the ability to aim rapidly at close range. In this situation, the use of a compact gun, such as a pneumatic spear gun, is desirable.

When the target is far away from the diver and not easily approachable, a shot with greater force at a longer range is required. In this situation, the use of a rubber band powered spear gun is desirable. However, aiming involves placement of one hand on the back end of the spear gun and the other hand on the grip part, which is also near the back end of the spear gun. Without leverage, it is very difficult to pivot the front end of the gun through dense water. Aiming becomes even more challenging if the target is a distant moving target. Laser pointers have recently been developed to aid in long range aiming. A laser pointer not only confirms to the underwater hunter the aim-point of the spear gun, the pointer also makes the gun easier to aim. Instead of having to hold the gun with the trigger hand at the grip and the aiming hand at the back end of the gun, and to pivot the gun using this awkward grip while aiming along the "sight" of the barrel, it now becomes possible to simply hold the gun with one hand on the grip and the other hand at or in front of the natural pivot point of the gun, and to fire the gun by aiming with the laser point rather than by sighting down the barrel. A "laser sight" tends to be desirable in many of the situations in which a long-barrel long-range type spear gun is used.

In other situations, when the diver is hunting in the dark, such as under bridges, at depth or near shipwrecks, it is desirable to use a flashlight to illuminate into crevices where fish tend to hide. Since handling a spear gun usually requires two hands, it is difficult to carry and aim a separate flashlight in one hand. Thus, in certain circumstances, it would be better to have a flashlight mounted to the spear gun, to leave the hands free for hunting.

Each one of different above-mentioned situations requires the use of a different type or configuration of spear gun. The underwater hunter needs to choose very carefully the type of underwater gun to be used according to his diving plans. However, dive plans change, environmental conditions change, targets of opportunity unexpectedly appear, and the underwater hunter, not having the right spear gun, may not be able to hunt the target fish.

Thus, it would be desirable to have a reconfigurable spear gun that provides the underwater hunter with the on-site capability of selecting or modifying the type of spear gun to be used and the accessories to be used, depending of the particular situation.

Yet another aggravation of spear fishing is that when a spear gun is set up for large or distant targets, and is then used to shoot a close-in or smaller target of opportunity, the spear may pass right through a fish, allowing the fish to escape. "Arrow stoppers" are known for use on arrows in land hunting, designed to prevent the arrow from going through the animal. However, arrow stoppers designed to work in thin air do not have problems of drag or premature deployment caused by resistance. Arrow stoppers will not work in dense water. There is thus a need for a spear stopper capable of preventing the back end of a spear from exiting the fish after the front of the spear has passed through the fish.

Another problem encountered by the underwater hunter is holding the spear gun during the reloading of the spear gun. Typically, the spear is inserted in the barrel of an elastic band type gun until it is seated in the trigger mechanism, and then the butt end of the gun is placed against the stomach and the elastic bands are pulled one at a time, with both hands, from the front of the gun and stretched to the back and set in notches in the spear. Underwater hunters wanting power out of their spear gun will use thick, powerful elastic bands. These bands are particularly difficult to stretch or draw, and many accidents occur as the butt of the gun slips from the stomach or as the rubber bands slip from the hands of the diver. Divers have come to accept the fact that reloading is a very difficult task.

In another circumstance, the diver encounters life-threatening situations that require the diver to distance or defend himself from an aggressive sea creature, such as a shark or barracuda. In such situations, the use of a power head (such as a 0.357 magnum power head commonly used on a defensive instrument known as a Bang Stick) may be required. This form of underwater firearm has been used as a means of defense against sharks for some time. Unfortunately, the use of a power head presents some problems: 1) the power head can be accidentally activated rendering it unsafe; and 2) the power head is attached to the end of a fishing spear making it difficult to aim. Thus, it would be desirable to have a power head mounted to the spear gun.

It would be also desirable to be able to provide a safety mechanism that prevents the power head to be discharged accidentally.

Thus, the art of spear fishing is still in need of significant improvement.

SUMMARY OF THE INVENTION

Accordingly, it is the main object of the present invention to provide a spear gun that provides the underwater hunter with the capability of reconfiguring a spear gun depending upon a particular situation.

It is yet another object of the present invention to provide a spear gun with interchangeable accessories, such as laser sight, power head, buoyancy compensation device and flashlight, which can be used to customize the spear gun according to the requirements of the user.

It is yet another object of the present invention to provide a spear gun with a spear having a spear stopper which is simple and inexpensive to manufacture, which substantially prevents the spear from passing through the fish and which is easy to attach to and remove from the spear.

It is yet another object of the present invention to provide a spear gun that is neutrally buoyant and easy to aim and fire.

It is yet another object of the present invention to provide a power head housing that facilitates the power head and serves as a protective cover for the power head prior to the immediate application of the power head by a bolt action extension.

It is yet another object of the present invention to provide a safety mechanism to prevent the power head to be fired or operated accidentally.

It is yet another object of the present invention to provide a spear gun reloading support that helps stabilize the spear gun during the reloading process. The spear gun support preferably accommodates spear guns of different makes and models.

Other objects and advantages of this invention will become more fully apparent as this description proceeds; reference being made to the accompanying drawings and appended claims.

The present invention concerns a double spear gun comprising:
a first spear gun having a top side and a bottom side;
a second spear gun having a top side and a bottom side;
a mounting means adapted to combine the two spear guns, the mounting means comprising:
an upper mounting block having a top side and a bottom side, the upper mounting block top side adapted for releasably engaging the bottom side of the first spear gun, the upper mounting block further including a fastening means;
a lower mounting block having a top side and a bottom side, the lower mounting block bottom side adapted for releasably engaging the top side of the second spear gun, the lower mounting block further including a fastening means;
wherein the fastening means of the upper mounting block is releasably engaged with the fastening means of the lower mounting block.

The upper mounting block comprises an elongated plate including a plurality of slots.

Further, the present invention contemplates a housing to accommodate a laser pointer or a flashlight.

The present invention also contemplates a laser housing for receiving a laser sight, the housing adapted to be mount in a spear gun, the laser housing comprising:
a tube adapted to be mounted on the spear gun; and
fastening means for attaching the tube to the spear gun.

Further the present invention contemplates a laser housing for receiving a laser sight, the housing adapted to be mount in a double spear gun, the double spear gun comprising:
a first spear gun having a top side and a bottom side;
a second spear gun having a top side and a bottom side;
a mounting means adapted to combine the two spear guns, wherein the laser housing comprises:
a tube adapted to be mounted on the mounting means; and
fastening means for attaching the tube to the mounting means;
wherein the laser housing is mounted between the first and second spear guns for accurate sighting of both spear guns.

The present invention also contemplates a support for holding a spear gun butt, the support comprising:
a belt adapted for being worn by a diver;
a front plate having a recess, a front side, and a back side;
a receiving cup connected to the recess of the front plate, the receiving cup adapted to hold the spear gun butt; and
a back compression plate connected to the back side of the front plate.

The inventor contemplates adding to the belt at least one overlock plate adapted to be engaged to the cummerbund of the BC by simply slipping the loading plate over the cummerbund and pushing it down into position. The back compression plate will help to keep the loading plate in place during operation.

The foregoing detailed description shows that the preferred embodiments of the present invention are well suited to fulfill the objects of the invention. It is recognized that those skilled in the art may make various modifications or additions to the preferred embodiments chosen herein to illustrate the present invention, without departing from the spirit of the present invention. Accordingly, it is to be understood that the subject matter sought to be afforded protection hereby should be deemed to extend to the subject matter defined in the appended claims, including all fair equivalents thereof.

BRIEF DESCRIPTION OF THE DRAWINGS

For a fuller understanding of the nature and objects of the invention, reference should be made to the following detailed description taken in connection with the accompanying drawings in which.

DETAILED DESCRIPTION OF THE INVENTION

While this invention has particular utility in connection with spear guns, it is to be understood that its utility is not confined thereto.

It should be noted that because these devices are to be used in combination with a spear gun, the materials of construction of all parts should be selected to prevent or minimize the corrosive effects of the underwater environment. Accordingly, it is desirable that many of the parts be constructed of polymeric plastics that are also capable of withstanding the mechanical and thermal stresses that are generated in the operation of the spear guns.

Otherwise, the use of coated metal parts is recommended, such as, for example, by chrome or nickel plating.

Figure 1:
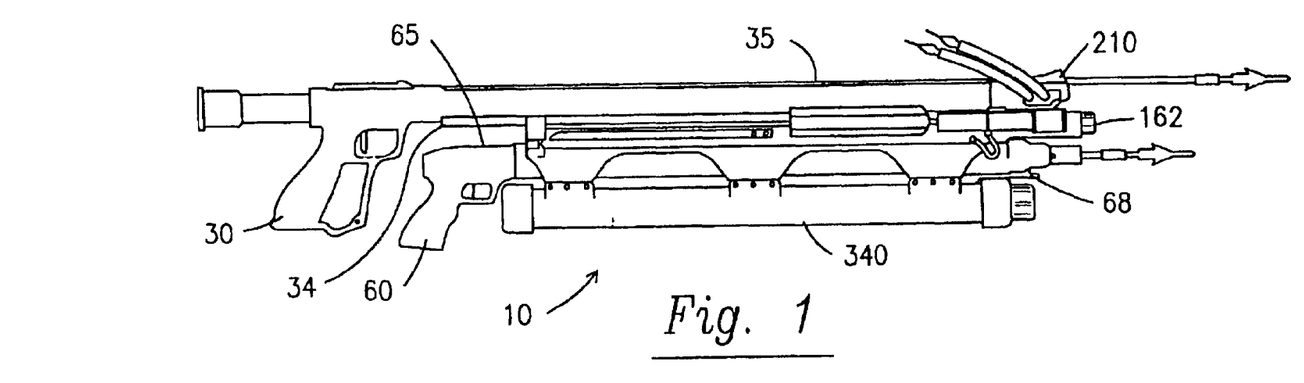
FIG. 1 shows the reconfigurable spear gun according to the present invention.
Figure 2A:
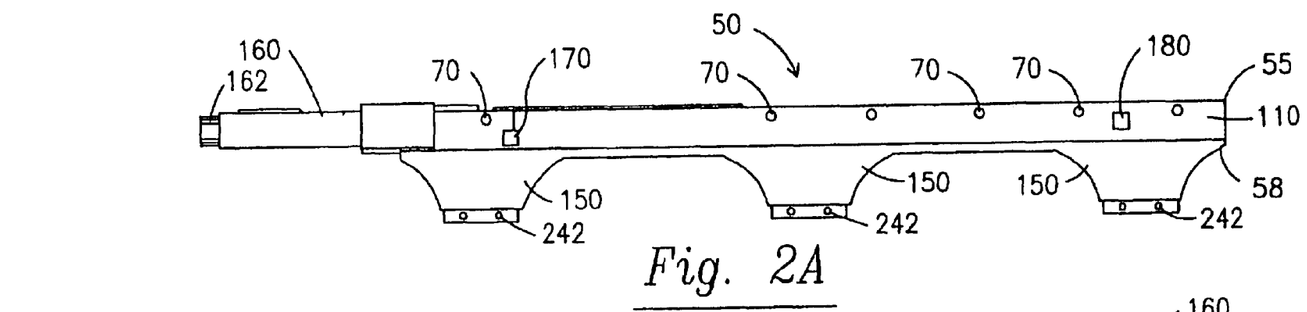
FIG. 2A shows a left side view of the lower mounting block of the joiner system, according to the present invention.
Figure 2B:
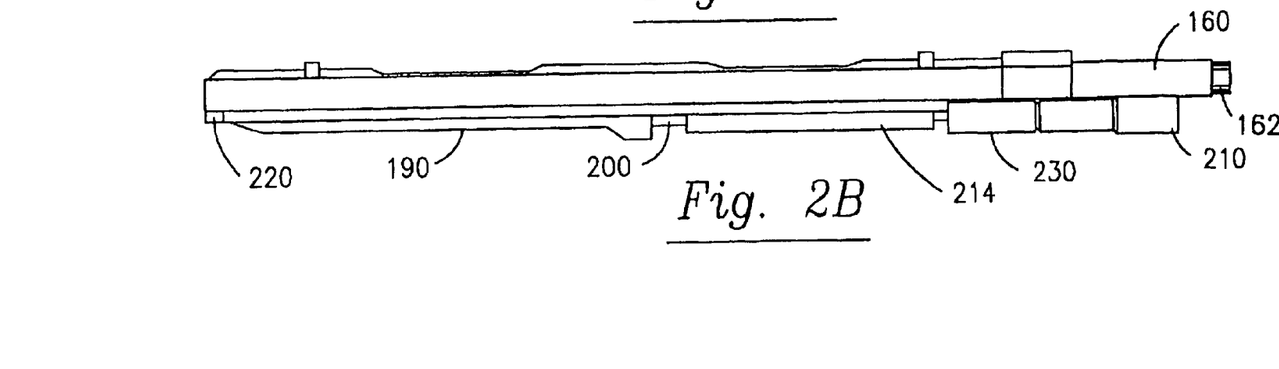
FIG. 2B shows a top view of the lower mounting block of the joiner system, according to the present invention.
Figure 2C:
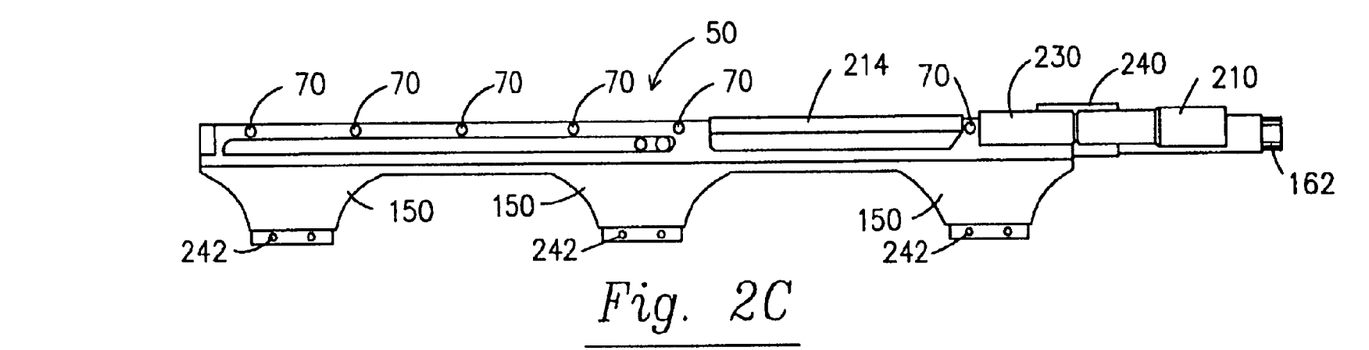
FIG. 2C shows a right side view of the lower mounting block of joiner system, according to the present invention.
Figures 2D, 2E, 2F:
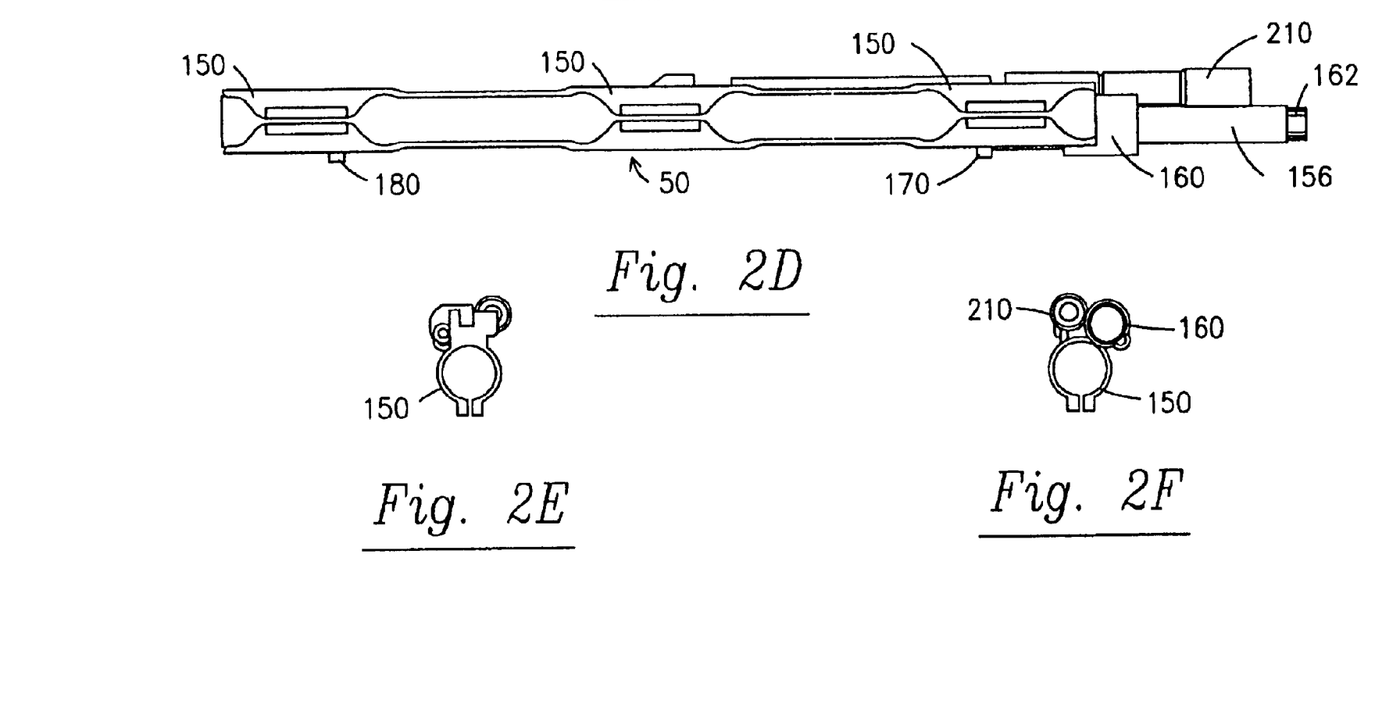
FIG. 2D shows a bottom view of the lower mounting block of joiner system, according to the present invention.
FIG. 2E shows a front view of FIG. 2A.
FIG. 2F shows a front view of FIG. 2C.

FIG. 1 shows the double spear gun according to the present invention.

The present invention concerns a double spear gun 10 comprising:
- a first spear gun 30 having a top side 35 and a bottom side 38;
- a second spear gun 60 having a top side 65 and a bottom side 68;
- a mounting means 32 adapted to combine the two spear guns, the mounting means comprising:
    - an upper mounting block 20 having a top side 25 and a bottom side 28, the upper mounting block top side 25 adapted for releasably engaging the bottom side 38 of the first spear gun 30, the upper mounting block further including a fastening means 40;
    - a lower mounting block 50 having a top side 55 and a bottom side 58, the lower mounting block bottom side adapted for releasably engaging the top side 65 of the second spear gun 60, the lower mounting block further including a fastening means 70;
    - wherein the fastening means of the upper mounting block 40 is releasably engaged with the fastening means of the lower mounting block 70.

The double spear gun of the present invention provides the underwater hunter with the on-site capability of selecting or modifying the type of spear gun to be used and the accessories to be used, depending on the particular situation.

Possible combinations are two sling guns, two pneumatic spear guns, or a sling gun and a pneumatic spear gun. Further a laser pointer, a flashlight, power head, or a float tube combination can be added to the double spear gun of the present invention.

The mounting means is made of plastic and measures between 15–50 inches in length and 3/16 to 1.5 inches in width, preferably 27 inches long and 3/8 inches width.

FIGS. 3 A–B shows the upper mounting block of the joiner system, according to the present invention.

Figure 3A:
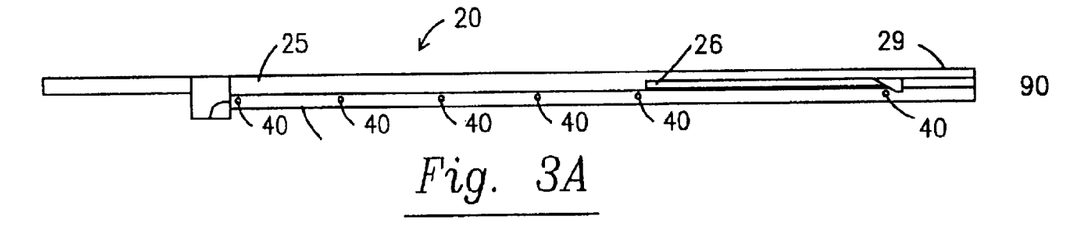
FIG. 3A shows a right side view of the upper mounting block of the joiner system, according to the present invention.
Figure 3B:
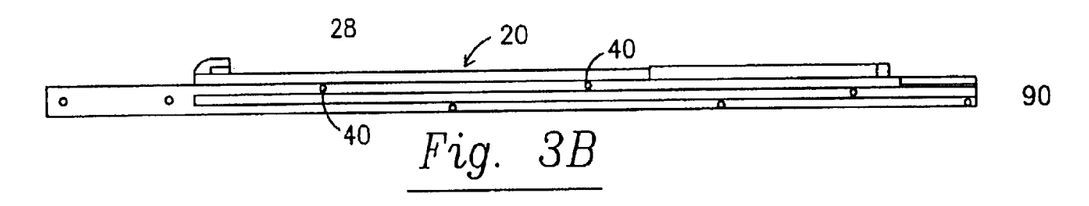
FIG. 3B shows a bottom view of the upper mounting block of the joiner system, according to the present invention.
Figure 3C:
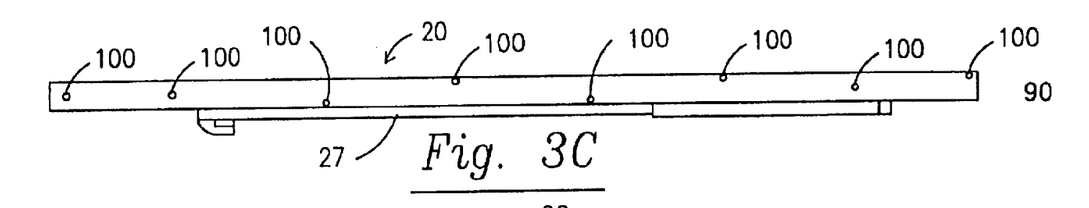
FIG. 3C shows a top view of the upper mounting block of the joiner system, according to the present invention.
Figure 3D:
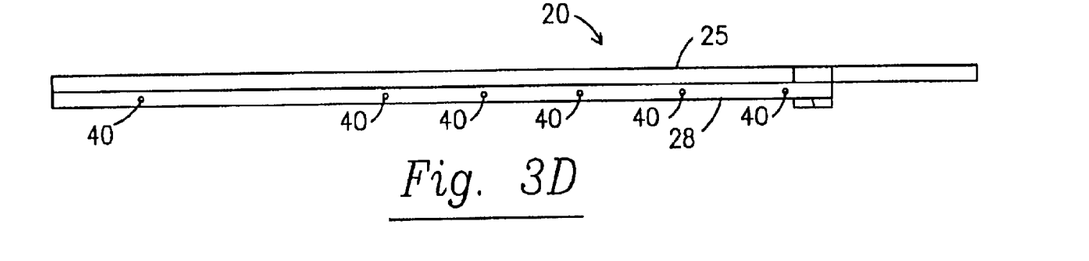
FIG. 3D shows a left view of the upper mounting block of the joiner system, according to the present invention.

The upper mounting block comprises an elongated plate 90 having several fastening means 100 adapted to be mounted to the first spear gun. The elongated plate also includes a plurality of slots 40 to be releasably engaged with the fastening means of the lower mounting block 70.

The elongated pattern of the upper mounting block 20 is used to ensure strength and stability when attaching the first spear gun to the upper mounting block of the joiner system.

The upper mounting block 20 is attached to the bottom of the first spear gun 30 by using any conventional fastening means 100 such as screws, bolts, glue, bands, clamps, or nuts. The present inventors preferably use a series of screws or bolts made of stainless steel.

FIGS. 2 A–D show the upper mounting block of the joiner system, according to the present invention.

The lower mounting block 50 of the joiner system is also made of plastic and measures between 15–50 inches in length. The top side 55 of the lower mounting block 50 comprises a plate 110 and several bolts and nuts 70 adapted to be engage with the fastening means 40 of the upper mounting block.

The bottom side 58 of the lower mounting block 50 comprises a plurality of projections 150 that are adapted to be attached to the top of the second spear gun 60 by using any conventional fastening means such as screws, bolts, glue, bands, clamps, or nuts. In the present invention, the bottom end comprises clamps of 1–4 inches in length, made from any suitable material for underwater use such as plastic. When using the clamps, the second spear gun is slid into the clamp, and then the clamps are tightened down by locking bolts 242 to lock the second spear gun in place.

The projections 150 help stabilize the second spear gun in place.

The top side 55 of the lower mounting block 50 further comprises:
- a laser housing 160 for receiving a laser sight 162;
- a forward sleeve 170 for mounting the spear of the second spear gun,
- a battery tube for a laser 158
- a rear sleeve 180 for mounting the spear of the second spear gun,
- a rear sleeve 190 for receiving a side rod 200 of a power head 210;
- a front sleeve 214 for receiving the slide rod 200;
- a stop plate 220 for slide rod 200;
- a housing 230 for receiving the power head 210,
- an open slot 240 for receiving and locking a safety pin 250, of the power head 210 avoiding the accidental discharge of the power head.

Float Tube

Figure 5:
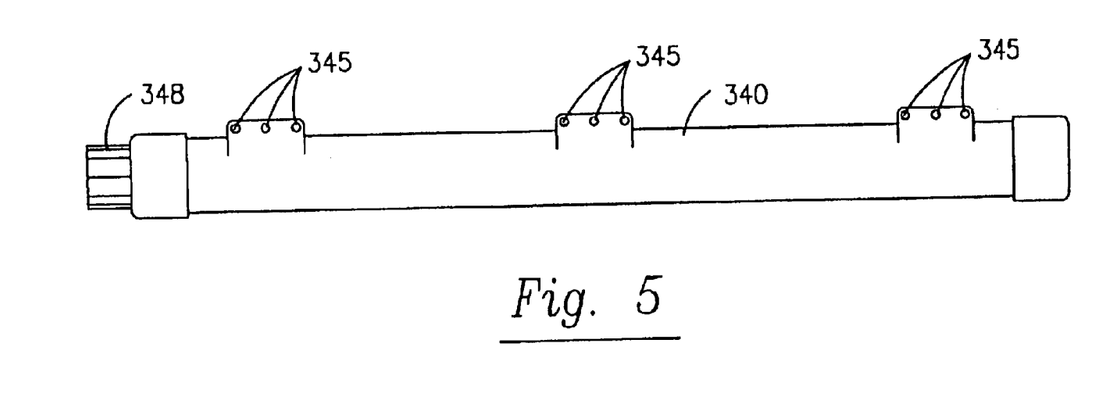
FIG. 5 shows a side view of the floating tube, according to the present invention.

FIG. 5 shows a floating tube or tubes, according to the present invention.

The present invention contemplates the use of at least one floating tube.

The float tube (s) 340 is (are) mounted on the bottom of the second spear gun to compensate the extra weight added to the present invention because of the combination of the two spear guns and the joiner system, as well as any other device that adds negative buoyancy to the present invention.

The float tube(s) increases the buoyancy of the spear gun to neutral buoyancy and helps eliminate the tendency of the spear gun to point downward instead of straight ahead.

Each float tube is between 10–30 inches long and 0.5 to 6 inches in diameter, preferably, 27 inches long and 2 inches in diameter.

The present invention also contemplates filling the float tube(s) with foam.

The float tube is attached to the bottom of the second spear gun by any fastening means 345 such as screws, bolts, glue, bands, clamps, or nuts.

At the end of the float tube, the present invention also contemplates the use of a flashlight 348 to allow the underwater hunter to see more easily.

Power Head Housing

Figure 6A:
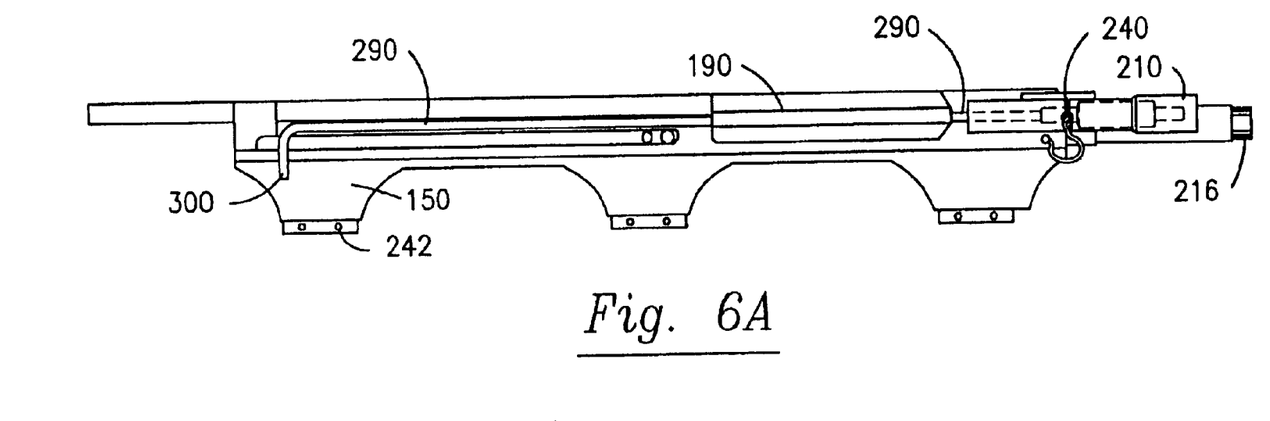
FIG. 6A shows a side view showing the power head housing having the power head in lock down position.
Figure 6B:
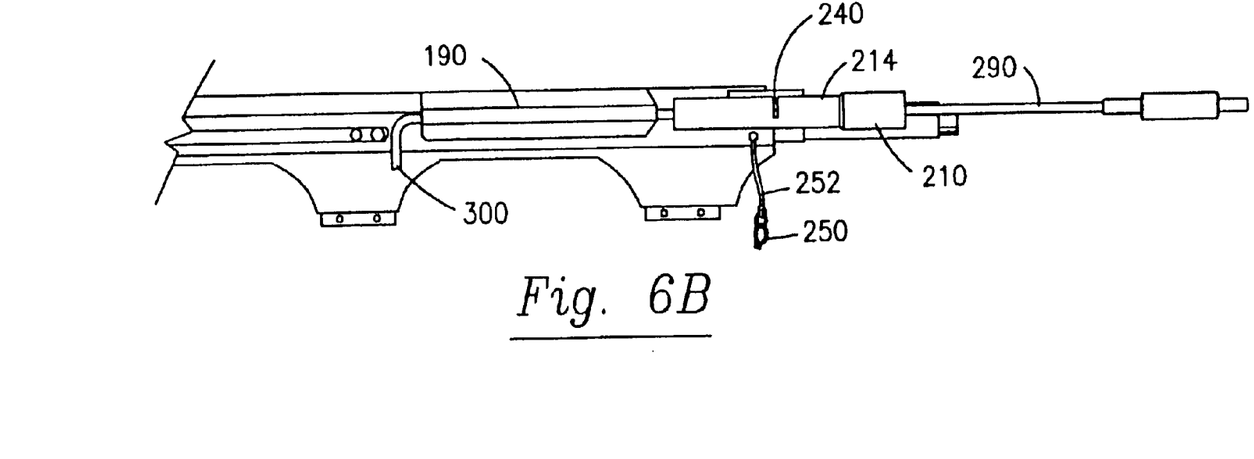
FIG. 6B shows a side view of the power head housing having the power head in a lock extended position ready for use.

FIGS. 6 A–B show the power head housing.

The present invention also contemplates a power head housing for receiving a power head, the housing adapted to be mounted to a spear gun, the power head housing comprising:
- a tube adapted to be attached to the spear gun;
- a slide rod attached to the power head;
- a safety pin adapted to be inserted onto a slot on the tube, the safety pin holds the power head in place;
- wherein when the slide rod is extended to the forward position, the power head is loaded and ready to be used; and
- wherein when the slide rod is pulled back, the power head is locked down.

The safety pin is tethered to the spear gun to avoid loosing the pin.

A power head is the term commonly used by divers to describe a device that can be attached to the end of a spear shaft. The device normally contains a chamber into which is placed an explosive device such as a shotgun cartridge. A firing mechanism is generally situated behind the cartridge chamber so that when the spear is fired towards a shark or similar large fish, the firing pin moves forward and activates the cartridge immediately when contact with the fish takes place.

The present invention contemplates adding a housing 230 for the power head 210. The housing 230 is attached to the lower block unit.

The housing 230 for the power head 210 is a tube having ⅜ to 2 inches of inside diameter, preferably ¾ of an inch of inside diameter.

The manufacturers of power heads supply a safety pin with each power head they sell. The manufacturers recommend keeping the safety pin in place until the diver is ready to discharge the power head to avoid accidentally discharging the power head.

According to the manufacturers' instructions, the operator may keep the safety pin in place in a safe manner by locking it in the safe position or pulling it when the spear gun is in use. But even if all the precautions are taken, in some occasions, the power head is accidentally discharged.

The present inventor surprisingly discovered a system that will provide the power head with security, and at the same time, will avoid that the safety pin is lost when the pin is pulled.

The power head 210 is encased in a housing and attached to a stainless rod 290 measuring between 20–30 inches in length, preferably 25¾ inches in length, and between 6–10 mm in diameter, preferably 8 mm in diameter. One end of the rod is turned at a 90-degree angle to form a handle 300 that measures between. 1–4 inches, preferably 2¼ inches. The handle has a rubber coating to easier use.

The combination of the power head housing and the slide rod prevents the accidental discharge of the power head, making the use of a power head safer than the original factory standard.

When the sliding rod 290 is extended to the forward position, the power head is loaded and ready to be used. When the rod is pulled back, the power head is locked down. To avoid accidentally discharging the power head, the present invention contemplates the use of a safety pin 250 that is adapted to be inserted onto a slot 240 on the lower block unit. Thus, the safety pin 250 reaches the power head and holds it in place, making it unable to discharge. The safety pin 250 is also tethered to the lower mounting block by a nylon cord 252 to avoid losing the pin.

Once the safety pin is pulled out, the stainless steel rod slides forward into a locking position. This allows the power head to go forward about 1½ past the longest spear and makes the power head ready for discharge in just seconds.

The safety pin has the functions of keeping the power head from accidentally discharging, and at the same time, for keeping the rod locking down.

The upper block unit further comprises an upper stabilizing plate 26 for the slide rod front sleeve, a slide bolt cover plate 27 for locking down the slide rod for the power head, and a recess 29 to allow the front sleeve of the power head to lay in place.

There is an extra spear holder attached to the lower mounting block to hold the spear for the second spear gun. By storing the spear on the side of the apparatus rather than in the spear gun is safer until you are in the water.

Laser Housing

The present invention contemplates providing the underwater hunter with a housing adapted to receive a laser sight 162.

The laser housing adapted to be mounted in a spear gun, the laser housing comprising:
- a tube adapted to be mounted on the spear gun; and fastening means for attaching the tube to the spear gun.

Further, the present invention contemplates a laser housing for receiving a laser sight, the housing adapted to be mounted in a double spear gun, the double spear gun comprising:

a first spear gun having a top side and a bottom side;

a second spear gun having a top side and a bottom side;

a mounting means adapted to combine the two spear guns, wherein the laser housing comprises:

a tube adapted to be mounted on the mounting means; and fastening means for attaching the tube to the mounting means;

wherein the laser housing is mounted between the first and second spear guns for accurate sighting of both spear guns.

Figure 4A:
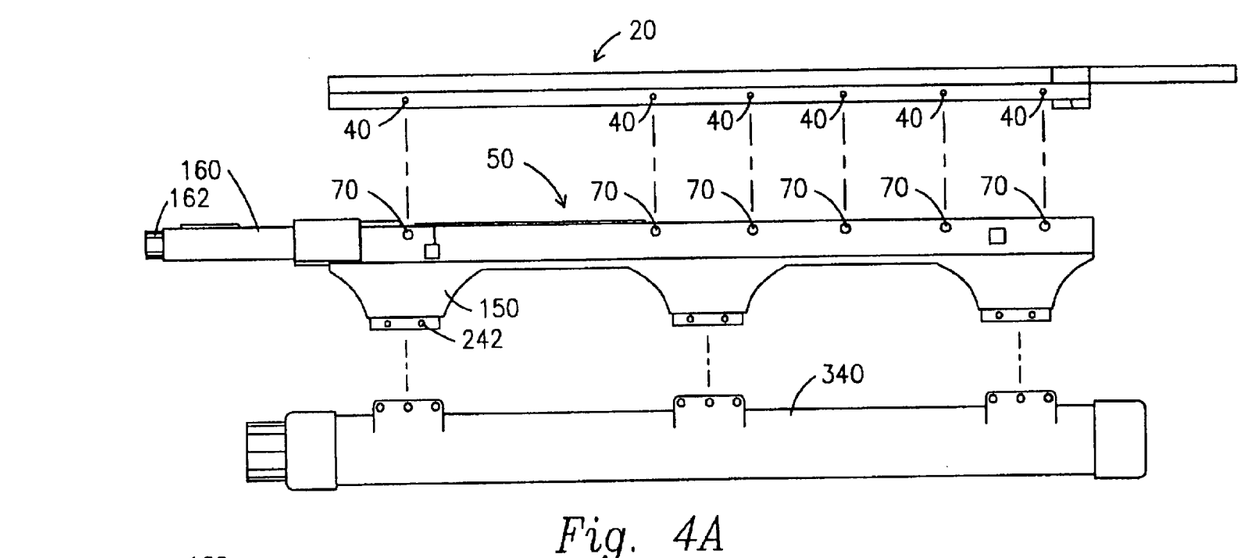
FIG. 4A shows an exploded view of the present invention showing the lower mounting block of the joiner system in combination with the float tube.
Figure 4B:
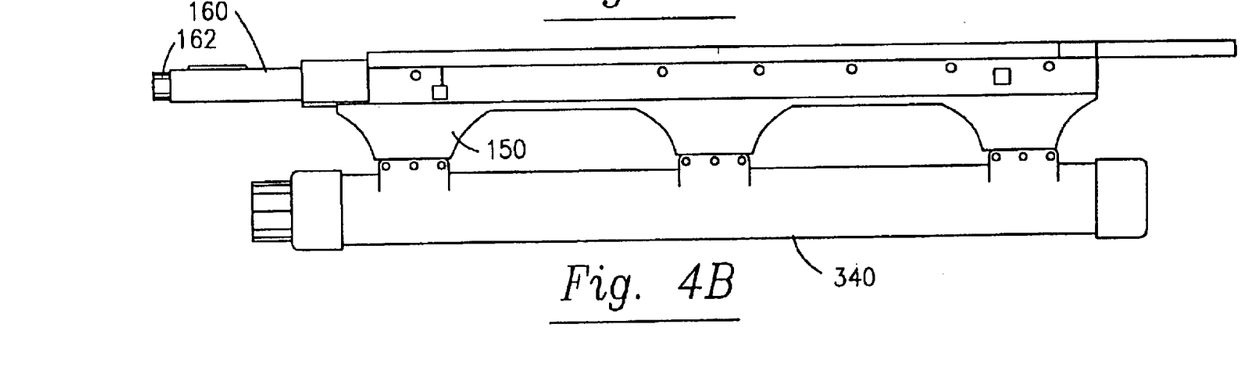
FIG. 4B shows a side view of the present invention showing the lower mounting block of the joiner system in combination with the float tube and the laser housing.
Figure 4C:
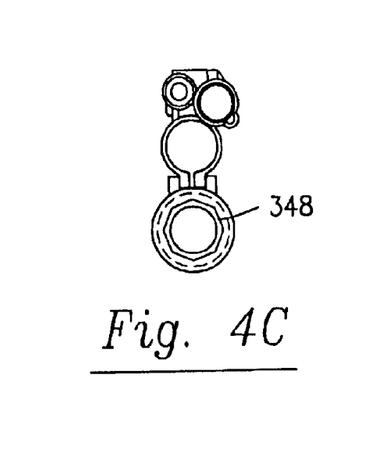
FIG. 4C shows a front view of FIG. 4B.
Figure 4D:
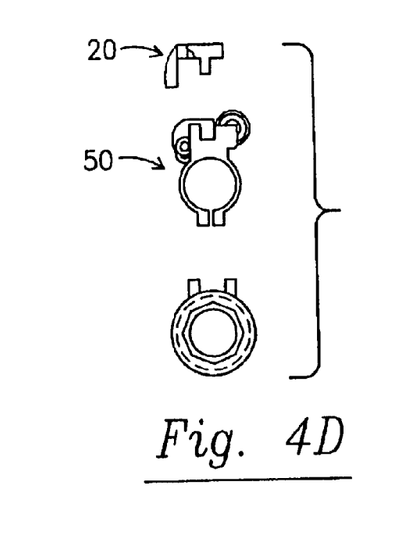
FIG. 4D shows a front view of FIG. 4A.

When a double spear gun is used, the laser housing 160, according to the present invention, allows the underwater hunter to connect a laser sight to the upper part of the lower block unit of the joiner system.

The laser housing comprises a tube that is adapted to be mounted on the joiner system. The laser housing is mounted to the front end of the joiner system by using any conventional fastening means such as screws, bolts, glue, bands, clamps, or nuts. The present inventors preferably use glue. The laser sight 162 is then placed in the laser housing 160.

The laser housing is mounted between the first and second spear guns for accurate sighting of both spear guns. Due to the position of the power head housing, the laser housing is offset by ¼ of an inch to the left of the center.

Loading Support

FIGS. 8A–9E show a support device for help on the reloading of a spear gun, according to the present invention.

The support 440 is designed to hold and stabilize the spear gun during the loading process. The support, according to the present invention, allows loading the spear gun more easily and with greater stability. The support prevents the slip of the spear gun, thus the loading process is safe.

When using a sling spear gun, the support will allow the use of stronger bands due to this stability.

The support is made of injection plastic measuring between 6–12 inches in width and between 5–10 inches in height, preferably 8.5" in width×7" in height.

A support 440 for holding a spear gun butt 445, the support comprising:

a belt 442;

a front plate 460 having a recess 470, a front side 480, and a back side 490;

a receiving cup 500 connected to the recess 470 of the front plate 460, the receiving cup adapted to hold the spear gun butt; and a back compression plate 510 connected to the back side of the front plate.

The loading plate is designed with a curvature to fit the body. The cup measures between 2 to 6 inches in width, 1 to 3 inches in height, 1 to 3 inches depth in the front, and 0.5 to 3 inches depth in the back. Preferably, 4¼" in width×2" in height×2" in depth in front×1½" in depth in back.

The cup angles away from the torso by approximately a 30-degree angle.

The front plate also includes a pair of slots, one on each side of the front plate to allow the user to insert the belt.

The inventor contemplates adding to the belt at least one overlock plate 518 adapted to be engaged to the cummerbund of the BC by simply slipping the loading plate over the cummerbund and pushing it down into position. The back compression plate will help to keep the loading plate in place during operation.

The design of the support helps the diver to simply grab the loading plate at the top and slip it off in case of an emergency.

Spear Stopper

Figure 7A:
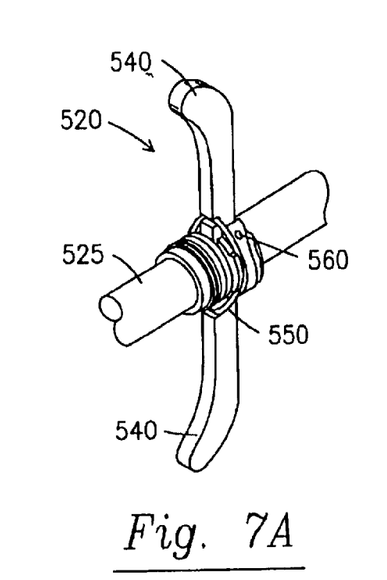
FIG. 7A shows a perspective view of the spear stopper in the open position, according to the present invention.
Figures 7B, 7C, 7E, 7F:
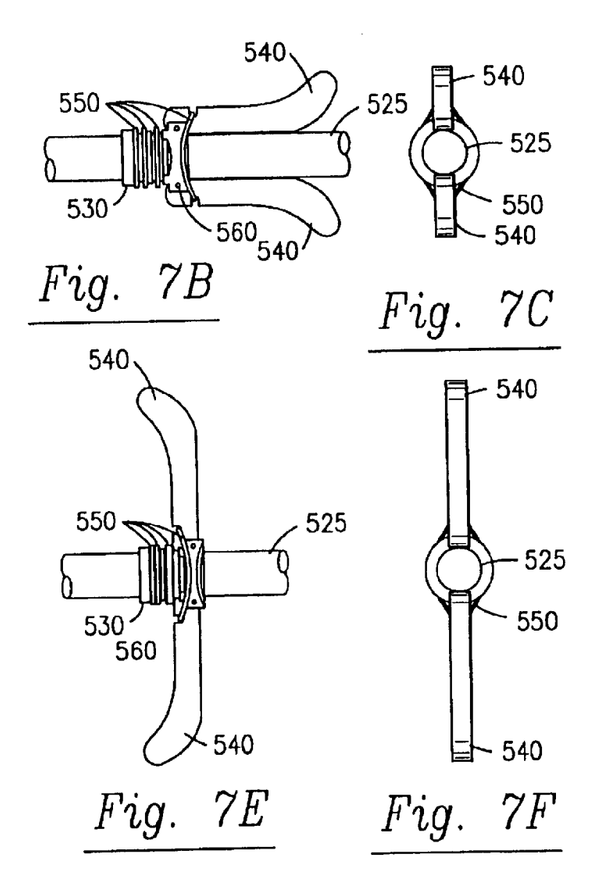
FIG. 7B shows a side view of the spear stopper in the closed position, according to the present invention.
FIG. 7C shows a top view of the spear stopper in the closed position, according to the present invention.
FIG. 7E shows a side view of the spear stopper in the opened position, according to the present invention.
FIG. 7F shows a front view of the spear stopper of FIG. 7A.
Figure 7D:
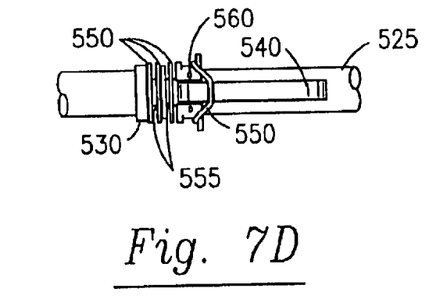
FIG. 7D shows a top view of the spear stopper of FIG. 7B.
Figures 8A, 8B:
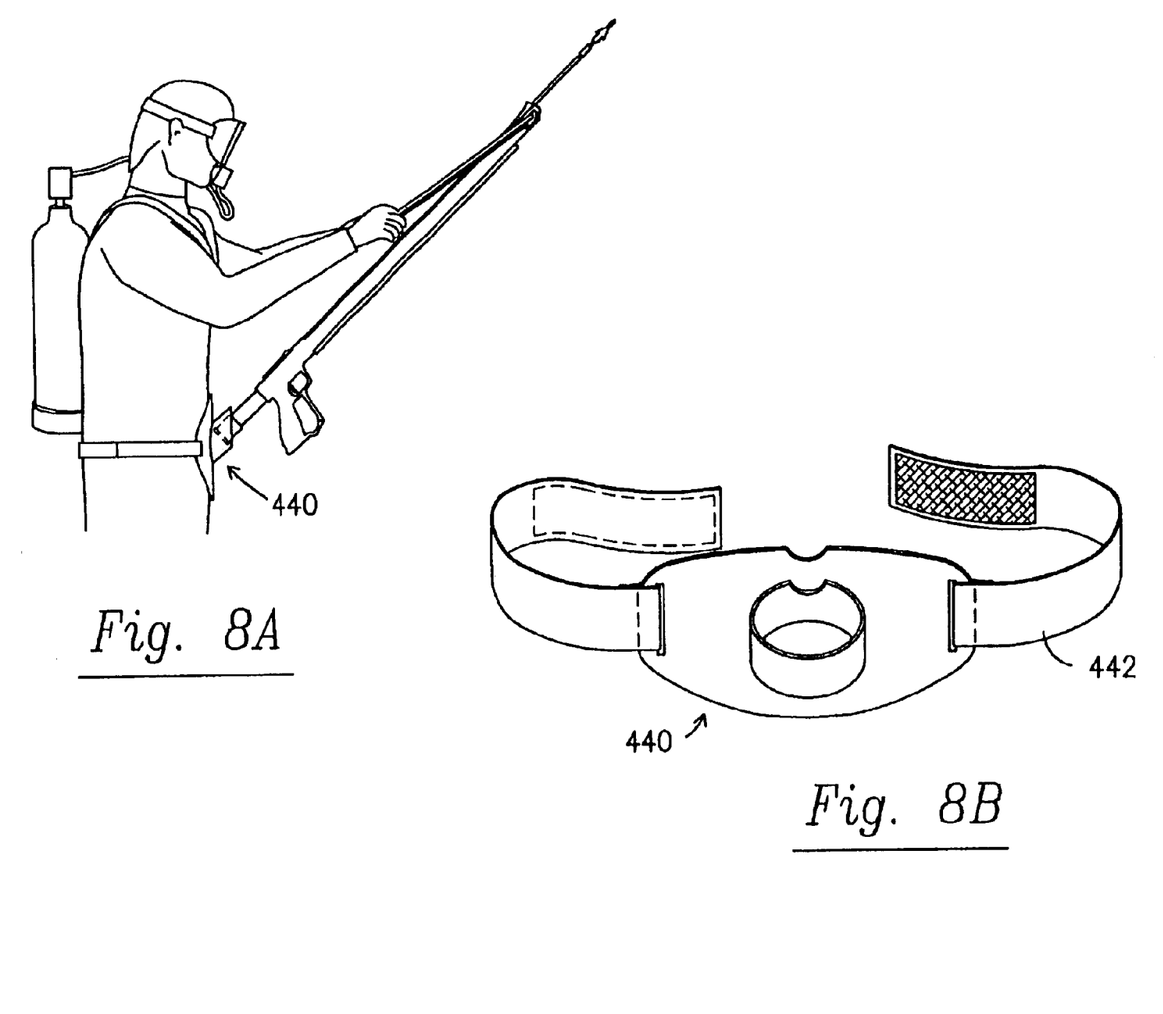
FIG. 8A shows a support device for help on the reloading a spear gun, according to the present invention.
FIG. 8B shows a front view of the support device for help on the reloading a spear gun combine with a belt, according to the present invention.
Figures 9A, 9B, 9C, 9D, 9E:
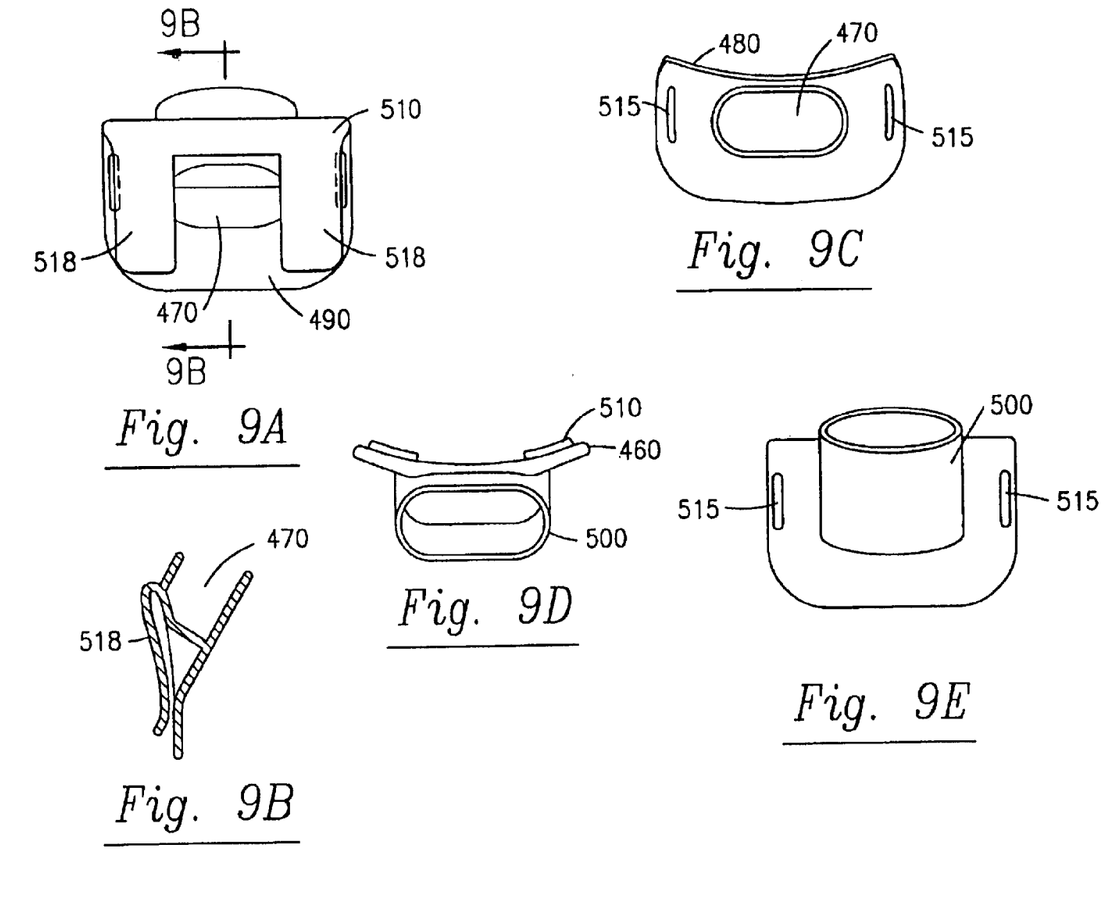
FIG. 9A shows a back view of the support device for help on the reloading a spear gun, according to the present invention.
FIG. 9B shows a side view of the support device for help on the reloading a spear gun, according to the present invention.
FIG. 9C shows a top view of the support device for help on the reloading a spear gun, according to the present invention.
FIG. 9D shows a perspective view of the support device for help on the reloading a spear gun, according to the present invention.
FIG. 9E shows a front view of the support device for help on the reloading a spear gun, according to the present invention.

FIGS. 7 A–F show a spear stopper, according to the present invention.

The present invention also contemplates a spear stopper 520 adapted to be used in conjunction with a spear, the stopper comprising:

a slide cylinder 530 adapted to be slid onto a spear shaft 525, the slide cylinder including a front end, a back end, wherein the front end comprises one slot and wherein the back end comprises at least one slot;

at least one pair of wings 540 pivotally connected to the front end of the slide cylinder;

a plurality of rubber bands 550 located on each slot; and a pin 560 for connecting the wings to the slide cylinder;

wherein the slot of the front end allows the wings to move in the downward and upward position.

The spear stopper prevents the back end of a spear from exiting the fish after the front of the spear has passed through the fish.

The wings 540 are made of stainless steel measuring between 0.2 to 1.0 inches long, 0.2 to 1.0 inches wide, 0.1 to 0.5 inches thick and with a tip between 0.05 to 0.6 inches, preferably ³⁄₁₆ inches long×³⁄₁₆ inches wide×³⁄₃₂ inches thick and a ⅜ inches tip.

The overall open position from tip to tip is between 1.5 to 3.5 inches, preferably 2⅝ inches.

The overall closed position from tip to tip is between 0.5 to 2.5 inches, preferably 1⅛ inches.

The slide cylinder 530 is made of stainless steel and measures between 0.1 to 1 inches long, 0.1 to 1.5 outside diameter, and 2 to 12 mm inside diameter, preferably ½ inches long×½ inches outside diameter×8 mm internal diameter.

The slide cylinder 530 includes a front end and a back end. The back end comprises a plurality of slots 555 for receiving a rubber band. The slots are between 2 to 6 mm depths, preferably 4 mm depth.

At the front end of the cylinder is a 1-½ mm slot 560 that allows the wings to move in the downward and upward position like a roller cam action.

The present invention uses as rubber bands cylindrical rubber gaskets measuring 7 mm internal×10 mm outside× 1½ mm diameter. The present invention preferably uses four rubber bands per unit.

The wings 540 are pivotally attached to the slide cylinder 530 by any suitable fastening means, preferably a 1.5 mm pin 560. The pin is fit into a hole through the slide cylinder and the wing, thus the wings are allowed to pivot in a downward and upward position.

As the shaft of the spear enters the fish, the spear stopper is impacted and slides back. As the slide cylinder moves back, the wings are forced to an opened position because of the action of the rubber band on the slot of the front end of the slide cylinder.

As the wings are opening, they produce a pressure on the rubber band located at the slot of the front end of the slide cylinder, which is working as a roller cam, and the bottom of the wings grab the spear shaft causing the total locking opened position on the spear stopper.

The rubber bands on the slots of the back end of the slide cylinder work as a break system because of the resistance of the rubber bands against the shaft.

The spear stopper of the present invention helps in the retrieving of hitting a fish because the fish cannot travel long distances with the spear attached to it.

Also, the spear stopper of the present invention prevents the loss of the spear while free shafting (using no tether line) if the spear goes in one direction while a wounded fish goes in another direction.

When using a tethered spear shaft, it will help prevent the wounded fish from tangling in the tether line.

This device can also slows the initial penetration of shaft enough to prevent the penetration into rocks and other hard damaging surfaces, which causes damage to the spearhead or the jamming of the spear into the rocks.

It is obvious that the spear stopper of the present invention can be applied also to arrows or other fishing implements.

Although this invention has been disclosed and described in its preferred form with a certain degree of particularity, it is understood that the present disclosure of the preferred form is only by way of example, and that numerous changes in the details of operation and in the combination and arrangement of parts may be resorted to without departing from the spirit and scope of the invention as hereinafter claimed.

What is claimed is:

1. A double spear gun comprising:

a first spear gun having a top side and a bottom side;

a second spear gun having a top side and a bottom side;

a mounting means adapted to combine the two spear guns, the mounting means comprising:

an upper mounting block having a top side and a bottom side, the upper mounting block top side adapted for releasably engaging the bottom side of the first spear gun, the upper mounting block further including a fastening means;

a lower mounting block having a top side and a bottom side, the lower mounting block bottom side adapted for releasably engaging the top side of the second spear gun, the lower mounting block further including a fastening means;

wherein the fastening means of the upper mounting block is releasably engaged with the fastening means of the lower mounting block.

2. A double spear gun, according to claim 1, wherein the upper mounting block comprises an elongated plate including a plurality of slots.

3. A double spear gun according to claim 1, further comprising a laser pointer.

4. A double spear gun according to claim 1, further comprising a flashlight.

5. A double spear gun according to claim 1, wherein the lower mounting block comprises:

a plate having a top end and a bottom end; wherein the top end comprises a plurality of bolts adapted to be connected with the upper mounting block; and wherein the bottom end comprises a plurality of projections adapted to be attached to the top of the second spear gun.

6. A double spear gun, according to claim 5, the bottom end further comprises a power head housing adapted to receive a power head sight.

7. A double spear gun, according to claim 6, the bottom end further comprises a safety pin to lock the power head in place.

8. A double spear gun, according to claim 1, further comprising a float tube, wherein the float tube is mounted to the bottom of the second spear gun.

9. A double spear gun, according to claim 1, the bottom end further comprises a laser housing adapted to receive a laser sight.

10. A double spear gun, according to claim 1, wherein the double spear gun is selected from the group consisting of a pneumatic and a sling spear gun, two pneumatic spear guns, and two sling spear guns.

* * * * *